(12) United States Patent
Nellen

(10) Patent No.: US 6,880,993 B2
(45) Date of Patent: Apr. 19, 2005

(54) PRINTER AND APPARATUS FOR GUIDING INKJET PRINTHEAD INCLUDING GUIDE RODS AND BEARINGS

(75) Inventor: Wilhelmus H. J. Nellen, Venlo (NL)

(73) Assignee: OCE-Technologies B.V., Venlo (NL)

( * ) Notice: Subject to any disclaimer, the term of this patent is extended or adjusted under 35 U.S.C. 154(b) by 0 days.

(21) Appl. No.: 10/699,783

(22) Filed: Nov. 4, 2003

(65) Prior Publication Data

US 2004/0091298 A1 May 13, 2004

(30) Foreign Application Priority Data

Nov. 6, 2002 (NL) .............................................. 1021851

(51) Int. Cl.⁷ .............................. B41J 2/01; F16C 29/02
(52) U.S. Cl. ....................................... 400/354; 400/352
(58) Field of Search .......................... 400/53, 161, 283, 400/352, 354, 354.1, 354.2; 384/37, 38, 42

(56) References Cited

U.S. PATENT DOCUMENTS 4,054,330 A * 10/1977 Luo ............................ 384/53
5,332,321 A 7/1994 Beauchamp et al. ........ 400/354

FOREIGN PATENT DOCUMENTS

| DE | 196 44 905 A1 |   | 5/1997 |
| EP | 1 013 457 A1 |   | 6/2000 |
| EP | 1 201 448 A2 |   | 5/2002 |
| GB | 2 306 685 A | * | 5/1997 |

* cited by examiner

Primary Examiner—Leslie J. Evanisko
(74) Attorney, Agent, or Firm—Birch Stewart Kolasch & Birch, LLP

(57) ABSTRACT

An arrangement for guiding a printhead fixed on a carriage, said carriage provided with plain bearings which are in sliding contact with a set of substantially parallel guide rods, wherein a first plain bearing is in contact with a first guide rod and a second plain bearing is in contact with a second guide rod, the second plain bearing being movably fixed to the carriage by means of a resilient element, wherein he resilient element allows substantially no movement of the second plain bearing with respect to the carriage in a direction parallel to the guide rods.

10 Claims, 3 Drawing Sheets

PRINTER AND APPARATUS FOR GUIDING INKJET PRINTHEAD INCLUDING GUIDE RODS AND BEARINGS

BACKGROUND OF THE INVENTION

This non-provisional application claims priority under 35 U.S.C. §119(a) on Patent Application No. 1021851 filed in The Netherlands on Nov. 6, 2002, which is herein incorporated by reference.

1. Field of the Invention

The present invention relates to an apparatus for guiding a printhead fixed on a carriage. The carriage is provided with plain bearings which are in sliding contact with a set of substantially parallel guide rods. A first plain bearing is in contact with a first guide rod and a second plain bearing is in contact with a second guide rod, the second plain bearing being movably fixed to the carriage by means of a resilient element. The present invention also relates to an inkjet printer provided with such an apparatus.

2. Related Art

An arrangement of this kind is known from U.S. Pat. No. 5,332,321. This arrangement comprises a set of two substantially parallel guide rods on which a carriage is mounted which is adapted to carry various inkjet printheads. The carriage is provided with three plain bearings, one of which is in sliding contact with the back guide rod and two in sliding contact with the front guide rod. Since three bearings are used, the position of the carriage can be accurately determined without the need to use bearings of a considerable length. This arrangement is used to move a number of printheads in a first direction with respect to a receiving material for printing. This first direction is also termed the main scanning direction. Each of the bearings is provided with two bearing surfaces by means of which a bearing slides over the guide rod. In principle, one bearing surface per plain bearing is sufficient for good guidance. However, in order to prevent the carriage from rotating or otherwise shifting in the plane formed by the two guide rods, two bearing surfaces are provided for each plain bearing so that the guide rods are, as it were, enclosed in the plain bearings. In principle, it should be sufficient to equip just one of the bearings with two bearing surfaces, but since the bearings have only a limited length it was decided to provide at least the two bearings on the front guide rod with two bearing surfaces.

The disadvantage of the plain bearings is that they must have a certain length in order to be sufficiently wear-resistant. Because of this length, the alignment of the bearings with respect to the guide rods with which they are in sliding contact is very important. Given poor alignment, the friction between the bearings and the rods is very considerable, and this is accompanied by intensive wear, accompanying noise and the need for a powerful motor to move the carriage over the rods. An alignment of this kind is effected by pre-machining of the bearings, as known from the prior art.

Another problem is that the guide rods are never 100% parallel because the guide rods can never be perfectly aligned with respect to one another and because the guide rods, either initially or through use, are always bent to a certain degree. As a result, at some locations of the set the plain bearings will experience a greater friction than at other locations. In order to prevent this from becoming inadmissibly large, the plain bearing in contact with the back guide rod is movably connected to the carriage so that this bearing can move with respect to the carriage and hence with respect to the other two bearings. Using a spiral spring, this plain bearing is forced to move away from the other two bearings in one direction. As a result of this resilient connection, the third plain bearing can adapt to the non-parallelism in the set of guide rods without any loss of defined position of the carriage with respect to the set. The other plain bearings are not resiliently connected to the carriage because otherwise the carriage could turn round in the plane formed by the two guide rods.

A significant disadvantage of the known arrangement and a printer provided with such an arrangement is that it results, to a varying degree, in a high-frequency noise when the carriage is moved over the set of guide rods. This is very disturbing to a user of the printer in which an arrangement of this kind is provided.

SUMMARY OF THE INVENTION

Accordingly, it is an object of the invention to prevent high-frequency noise or at least greatly reduce its incidence when the carriage is moved over the guide rods. To this end, an apparatus has been developed wherein the resilient element allows substantially no movement of the second plain bearing with respect to the carriage in a direction parallel to the guide rods.

In the apparatus according to the present invention, in which the second plain bearing cannot move in the main scanning direction with respect to the carriage, it has been found that the incidence of high-frequency noise can be prevented completely or to an appreciable extent, while there is nevertheless sufficient freedom of movement in order to adapt the position with respect to the carriage so that deviations in the parallelism of the rods can be effectively absorbed. The reason for this is not completely clear. Perhaps, in the known arrangement, on a movement of the bearing in the main scanning direction, a situation occurs in which the two bearing surfaces of said bearing are no longer in contact with the surface of the guide rods. This may lead to the undesirable accompanying noise. What is important, however, is that a resilient element is selected which has a high degree of stiffness in the main scanning direction so that substantially no movement of the plain bearing can take place with respect to the carriage, in that direction. The resilient element may consist of one part but may alternatively be built up of different parts, which may or may not be in contact with one another, and which provide the required freedom of movement in mutual co-operation. In the arrangement according to the present invention a small movement in the main scanning direction will always be possible, for example of the order of magnitude of a few tens of micrometers, because there are, for example, tolerances in making the components or because conventional construction materials are often elastically deformable to some extent.

In one embodiment, the resilient element allows the greatest movement of the plain bearing with respect to the carriage in the plane formed by the first and a second guide rods. It has been found that in this embodiment the non-parallelism of the two guide rods can be absorbed in the most optimal manner without this being to the detriment of accuracy and accompanying noise.

In another embodiment the resilient element is a leaf spring. This embodiment is particularly advantageous because a leaf spring is very cheap and, of itself, has a high rigidity in the plane of the leaf. As a result, an arrangement according to the present invention can be obtained in a simple and inexpensive manner. Another advantage is that a leaf spring, if not prestressed, does not tend to exert a resilient force on the plain bearing in any direction whatsoever. As a result, the plain bearing can be fixed to the carriage without prestressing. This is an advantage because in this way no extra friction occurs between the plain bearing and the guide rod, so that wear and tear is reduced. Another advantage is that resonance of the spring seldom occurs, if at all, because of the considerable rigidity in the plane of the leaf spring.

In a further embodiment, the second plain bearing is fixed via the leaf spring to the carriage in such manner that the plane of the leaf spring is parallel to the set of guide rods and is perpendicular to the plane formed by said rods. In this embodiment, the leaf spring can serve to absorb both the non-parallelism of the guide rods and to fix the plain bearing to the carriage. A simple construction results. The specific location of the leaf spring ensures great freedom of movement of the plain bearing in the said plane and also guarantees high rigidity in the main scanning direction.

In another embodiment, the guide rods have substantially a round peripheral line and the bearing surfaces are concave. This embodiment has the advantage that each bearing surface is in contact over at least two lines with the guide rod corresponding to that surface. In the known arrangement, there is only one point of contact, at least in cross-section, between the bearing surface and the guide rod since the rod is round and the bearing surface is convex or completely flat. On movement of the plain bearing with respect to a guide rod, a contact line forms in this way. The friction is very high at the location of said contact line and this may not only be accompanied by obstructive noise but may also result in a high degree of wear of the bearing surface and/or guide rod. In the arrangement according to this embodiment, a bearing surface acts on the guide rod at, at least two points, so that the disadvantages described above are obviated.

In another embodiment, each bearing surface is an arc of a circle having a diameter substantially equal to the diameter of the guide rod which is in contact with said bearing surface. In this embodiment, the bearing surface bears snugly around the guide rod. This improves obviating the above-described disadvantages. If, for example, the contact between the bearing surface and the guide rod is considered on the micro-scale, this embodiment also has one or more contact lines when the plain bearing moves over the guide rod, simply because perfect correspondence between the outer surface of the guide rod and the inner surface of the bearing cannot be embodied. This embodiment is also advantageous with respect to the known and above-described embodiment, because the contact lines will now be arbitrarily able to and will shift over the entire contact surface. A temporary contact over a specific contact line with the guide rod ensures a high degree of wear at the location of said contact line so that in the course of time this contact will be taken over by a new contact line or contact surface. Ideally, over the course of time, when the plain bearing has run in sufficiently, a contact surface will form which, over its entire extent, makes contact with the guide rod. The wear is minimised as a result, and the incidence of obstructive accompanying noises is further suppressed and friction is easily overcome.

In another embodiment, the two bearing surfaces of a plain bearing are in contact with a guide rod substantially at the top thereof. In this embodiment, the plain bearing and hence the carriage, if this is carried out for all the plain bearings, rests on the top of the guide rod. Since both bearing surfaces are situated on the top of the rod, good contact will form between the bearing surfaces and the guide rod due to the action of gravity. As a result, no additional contact pressure means are required, as are known in the prior art, in order to press one or more of the surfaces against the guide rod.

In another embodiment, the bearing surfaces are made from Iglidur X. This material, which originates from Messrs Igus of Cologne (Germany) has been surprisingly found to be very wear-resistant when used in an arrangement such as that of the present invention, particularly when the guide rods are made from stainless steel. IGLIDUR X relates to a material in which the main constituent is a poly-ether-ether-ketone (PEEK), in which islets of a few tens of square micrometers in size are present, which islets contain a high concentration of fluorine atoms. The use of this material also provides very low wear even after many thousands of kilometers of sliding load, such wear typically being less than one tenth of a millimeter.

The present invention also relates to an inkjet printer provided with an arrangement according to one of the preceding embodiments. An inkjet printer is a printing device which typically makes use of an arrangement for moving the printheads with respect to the receiving material for printing. Since the printing of this material is often accompanied by many reciprocating movements of the carriage over the set of guide rods, an arrangement which suppresses the incidence of obstructive accompanying noise and is also simple, cheap and reliable, can be used particularly advantageously in a printer of this kind.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
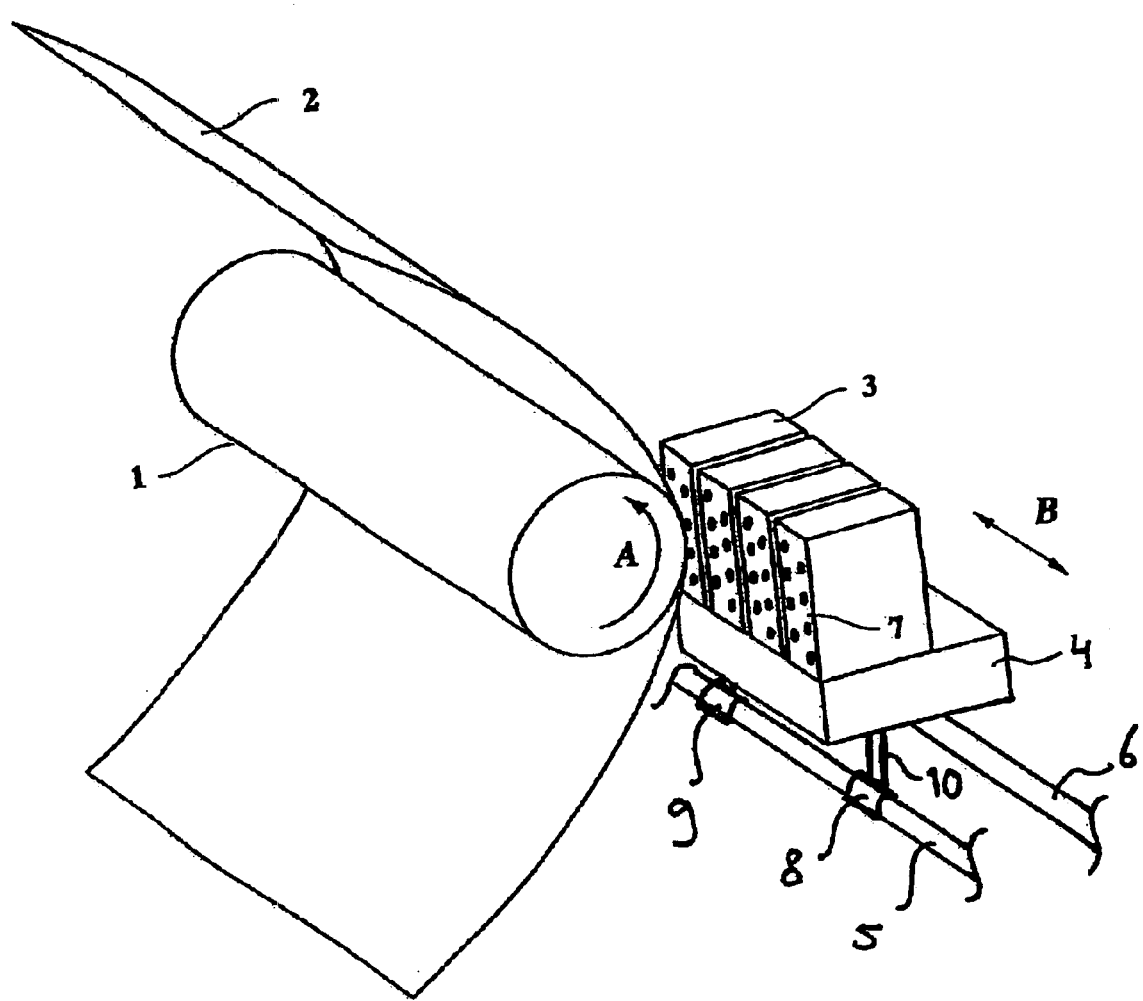
FIG. 1 is a diagram showing an inkjet printer provided with an arrangement according to the present invention.

FIG. 1 diagrammatically illustrates an inkjet printer provided with a device according to the invention. In this embodiment, the inkjet printer comprises a roller 1 which supports a substrate 2 and moves across the four printheads 3. The roller 1 is rotatable about its axis as indicated by arrow A. A carriage 4 carries the four printheads 3. In this embodiment the printheads are releasably fixed to the carriage but in another embodiment they could also be permanently fixed thereof or even form a unit with the carriage. The carriage 4 can be moved in reciprocation in a direction indicated by the double arrow B, parallel to roller 1. This direction is also termed the main scanning direction, while direction A is considered the subscanning direction. By moving the printheads in this way with respect to the substrate 2 it is possible for the printheads 3 to completely print the receiving substrate 2, for example a sheet of paper. The carriage 4 is guided over guide rods 5 and 6 and is driven by suitable means (not shown).

The carriage is slidingly fixed on the guide rods by means of three plain bearings, of which two bearings 8 and 9 rest on the front guide rod and the third bearing rests on the back guide rod (not shown). The bearings 8 and 9 are rigidly connected to the carriage 4. The bearing not shown on the rear guide rod is resiliently connected to the carriage. The position of the carriage is adequately determined by these three points of support. Of course it is also possible to provide the front guide rod with one plain bearing and the rear guide rod with two plain bearings.

Within one guide rod there will always be an imperfect form of guidance, for example a local deviation in the thickness of the rod or a certain degree of crookedness. These deviations will increase the friction with the plain bearing. In order to obviate or at least reduce this friction, the bearing housings are first mounted on the carriage and then milled before they are mounted on their guide rod. The two fixed bearings on the front guide rod are, in this way, brought into alignment with the guide rod, as far as possible. The housing of the plain bearing resiliently connected to the carriage is also milled before assembly. For this purpose, this bearing must be fixed during the milling operation with respect to the carriage. After the milling operation, the actual bearing surfaces are assembled in each bearing housing. Remaining deviations within one guide rod are then reduced by the wear of the rod and the plain bearings, and some of the deviations can be absorbed by a slight elastic deformation of all the parts co-operating with one another.

The deviations between the two guide rods, and incomplete parallelism, however, are difficult to obviate completely by such milling, wear, and elastic deformation, because greater deviations are frequently involved. For this purpose, the plain bearing disposed slidingly on the rear guide rod 6 is resiliently connected to the carriage. This resilience is such that the plain bearing, relatively speaking, has considerable freedom of movement in the plane formed by the two guide rods. There will also be a certain freedom of movement in the plane parallel to the front of the printheads 3 (which side contains the nozzles 7). Basically no movement is admissible in the main scanning direction B. It should be clear that in principle it is also possible to resiliently connect the bearings 8 and 9 to the carriage and that the bearing which is not illustrated can be fixed with respect to the carriage. Deviations in the parallelism of the guide rods 5 and 6 can then also be absorbed. In this form of construction, however, it is more difficult to obviate turning of the carriage in the plane parallel to the plane through the guide rods.

In an embodiment illustrated in the drawing, each printhead comprises eight ink ducts (not shown), each with its own nozzles 7, which form two rows of four nozzles each perpendicular to the axis of the roller 1. In a practical embodiment of the printer, the number of ink ducts per printhead will be many times greater. Each ink duct is provided with means for energising the ink duct (not shown) and an associated electric actuating circuit (not shown). In this way, the ink duct, the means for energising the ink duct and the actuating circuit form a unit which can serve to eject ink drops in the direction of roller 1. If the ink ducts are energised image-wise, an image forms on the substrate 2 built up from ink drops.

When a substrate is printed with a printer of this kind, from which ink drops are ejected from ink ducts, the substrate, or a part thereof, is (imaginarily) divided into fixed locations which form a regular field of pixel rows and pixel columns. In one embodiment, the pixel rows are perpendicular to the pixel columns. The resulting separate locations can each be provided with one or more ink drops. The number of locations per unit of length, in directions parallel to the pixel rows and pixel columns is termed the resolution of the printed image, indicated for example as 400×600 d.p.i. ("dots per inch"). By energising a row of nozzles of a printhead of the printer image-wise when the printhead moves over a strip of the substrate in a direction substantially parallel to the pixel rows, the row of nozzles being substantially parallel to the pixel columns, as shown in FIG. 1, an image is formed by the built up of ink drops on the substrate.

Figure 2:
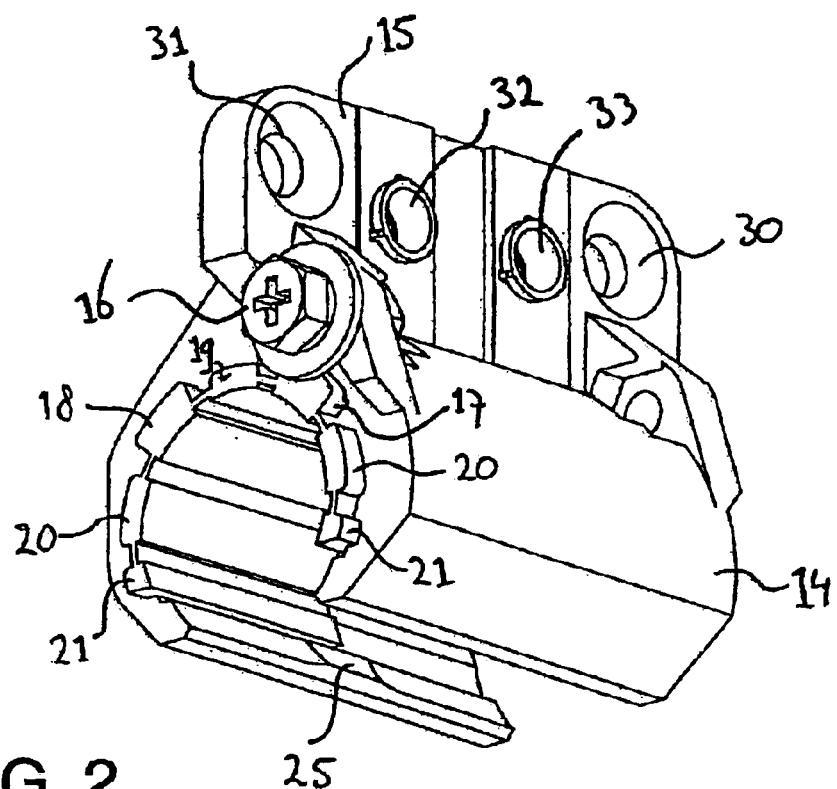
FIG. 2 is a diagram showing a plain bearing, in perspective view.

FIG. 2 diagrammatically illustrates a plain bearing 8 in perspective. The bearing consists of a housing 14 the top of which is provided with a fixing means 15. The latter is in turn provided with mounting holes 30 and 31 by which the bearing can be fixed to the carriage. Holes 32 and 33 are used for temporarily fixing the bearing, if necessary, when the bearing has to undergo a milling operation as described in connection with FIG. 1.

On the inside, the housing 14 is provided with a bearing ring built up of the elements 17 to 21. This ring is made from the material IGLIDUR X made by Messrs Igus, of Cologne (Germany). The ring comprises bearing surfaces 17 and 18, which surfaces are in sliding contact with a guide rod which is received in the cavity which is defined by the bearing housing 14. These surfaces are supported by the housing 14 on a side remote from the guide rod. In this embodiment, the bearing area of the two bearing surfaces together is about 100 mm2. The two bearing surfaces are situated at the top of the guide rod. The optimal location of these surfaces depends on the total forces to which the carriage is subjected during movement, particularly those forces which do not act on the center mass of the carriage. It is generally known how an optimal attitude can be calculated so that the risk of the bearing lifting is minimized. The element 19 is situated more deeply in the housing and when the bearing is in use will not make contact with the guide rod. Elements 20 and 21 do not lie deeper in the housing, but since there is no support on the side remote from the guide rod (these elements are bounded at the rear by a cavity in the bearing housing 14), these elements, just like element 19, cannot be used as a bearing surface. These elements serve only to give the bearing ring sufficient rigidity so that it can be mounted in the housing 14. The spaces situated more deeply between these elements 19, 20 and 21 and the bearing surfaces 17 and 18 serve to discharge worn material.

The bearing ring is fixed to the housing 14 by fixing means 16. The ring is replaceable. The housing also contains two bottom surfaces, one of which, surface 25, is illustrated. These surfaces serve to enclose the guide rod but in normal use will not make contact with the rod.

Figure 3:
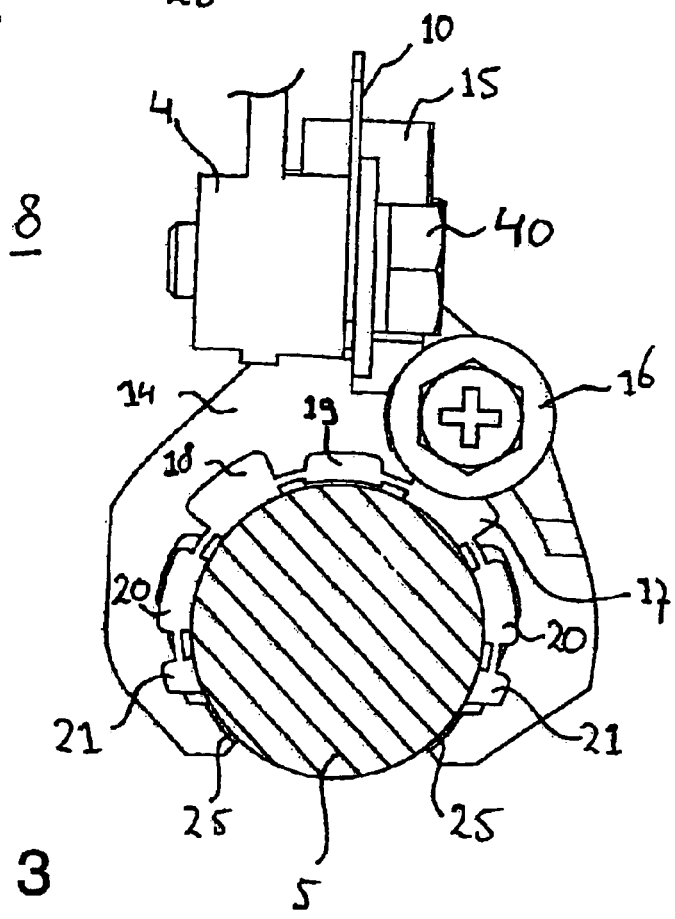
FIG. 3 is a diagram showing the plain bearing of FIG. 2 in side elevation, including a part of the carriage and a resilient element therebetween.

The plain bearing of FIG. 2 is shown in cross-section in FIG. 3, the guide rod 5 also being shown, with which the bearing is in sliding contact. It will be seen that bearing surfaces 17 and 18 are in contact with the guide rod 5 and that element 19 is situated somewhat more deeply within the housing 14. Elements 19 and 20 in this Figure bear against the guide rod 5 but as described hereinbefore in connection with FIG. 2 these elements are not bearing surfaces because they are not supported by the housing 14 on the side remote from the guide rod.

FIG. 3 also shows leaf spring 10 which is fixed by fixing means 40 to carriage 4. As a result the bearing has a relatively large freedom of movement in a direction perpendicular to the guide rod. Due to the intrinsic stiffness of the spring in the direction parallel to the guide rod, the position of the bearing with respect to the carriage in this direction is substantially fixed.

Figure 4A:
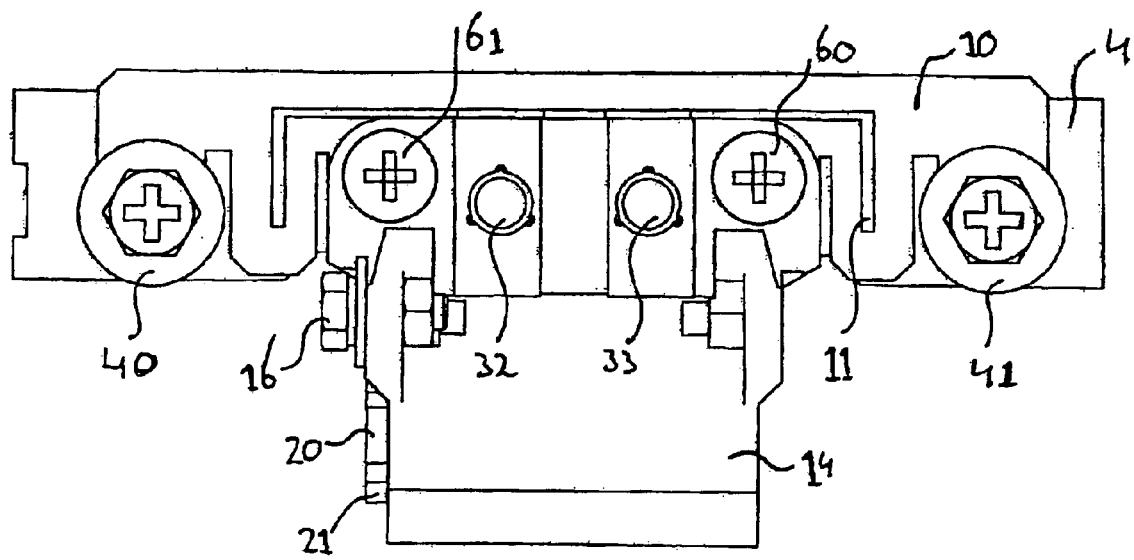
FIG. 4 is a diagram showing a plain bearing connected to a carriage by means of a leaf spring.

FIG. 4a diagrammatically illustrates a plain bearing identical to plain bearing 8 in FIG. 2, which is fixed by a leaf spring 10 to the carriage 4. In this embodiment the leaf spring 10 comprises a substantially rectangular base member made from a thin metal plate of an order of magnitude of typically 1 to a few tenths of millimeters, preferably from spring steel. Recesses 11 and 12 are made in this plate so that there is a relatively large freedom of movement of the bearing with respect to the carriage in a direction perpendicular to the drawing plane. The leaf spring is fixed to the plain bearing by fixing means 60 and 61 disposed in the holes 30 and 31 (not shown). The leaf spring 10 is fixed by fixing means 40 and 41 to the carriage 4. Since the carriage has a recess extending over practically the entire length of the spring at the location thereof, the leaf spring is not enclosed between means 15 and the carriage. As a result, the plain bearing can change its position with respect to said carriage.

Figure 4B:
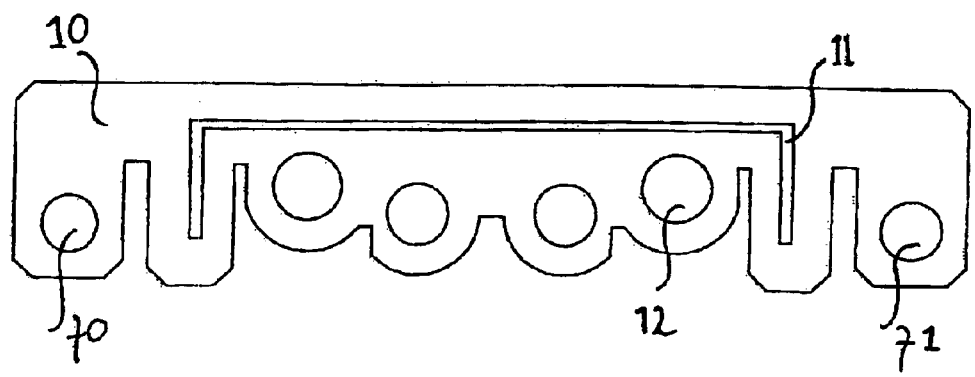

In FIG. 4b, the leaf spring is shown in side elevation. In addition to the recesses 11 and 12, recesses 70 and 71 are also visible, which serve to receive the fixing means 40 and 41 as described hereinbefore.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for guiding a printhead fixed to a carriage, which comprises:
    a carriage,
    a set of substantially parallel first and second guide rods;
    at least first and second plain bearings operatively connected with said carriage and in sliding contact with said set of substantially parallel first and second guide rods;
    said first plain bearing in contact with said first guide rod is rigidly connected to the carriage and said second plain bearing is in contact with said second guide rod, the second plain bearing being movably fixed to the carriage by a resilient element, wherein the resilient element allows substantially no movement of the second plain bearing with respect to the carriage in a direction substantially parallel to the first and second guide rods.

2. The apparatus according to claim 1, wherein the resilient element allows the greatest movement of the second plain bearing with respect to the carriage in the plane formed by the first and a second guide rods.

3. The apparatus according to claim 1, wherein the resilient element is a leaf spring.

4. The apparatus according to claim 3, wherein the second plain bearing is fixed via the leaf spring to the carriage in such a manner that the plane of the leaf spring is substantially parallel to the set of first and second guide rods and is substantially perpendicular to the plane formed by said rods.

5. The apparatus according to claim 1, wherein the guide rods have a substantially round peripheral line and the bearing surfaces are concave.

6. The apparatus according to claim 5, wherein each bearing surface is an arc of a circle having a diameter substantially equal to the diameter of the guide rod which is in contact with said bearing surface.

7. The apparatus according to claim 1, wherein the first plain bearing has two bearing surfaces, and wherein both bearing surfaces of said first plain bearing are in contact with the first guide rod substantially at the top thereof.

8. An inkjet printer provided with the apparatus of claim 1.

9. A printhead carriage plain bearing comprising:
    a housing containing a cavity provided with a bearing ring for sliding contact between the printhead carriage plain bearing and a guide rod, said bearing ring having a first side facing the guide rod and an opposing second side facing a cavity wall, the first side being provided with recesses as well as the second side thereof and/or the cavity wall, such that the bearing ring is divided into a plurality of segments, two of which having a bearing surface for providing sliding contact with the rod, said two segments being supported at their second side by the cavity wall, and said plurality of segments including an adjacent segment that is not supported by the cavity wall.

10. An apparatus for guiding a printhead fixed to a carriage, which comprises
    a carriage,
    a set of substantially parallel first and second guide rods;
    at least first and second plain bearings operatively connected with said carriage and in sliding contact with said set of substantially parallel first and second guide rods;
    said first plain bearing having two bearing surfaces, and wherein both bearing surfaces of said first plain bearing being in contact with the first guide rod substantially at the top thereof,
    said first plain bearing in contact with said first guide rod and said second plain bearing is in contact with said second guide rod, the second plain bearing being movably fixed to the carriage by a resilient element, wherein the resilient element allows substantially no movement of the second plain bearing with respect to the carriage in a direction substantially parallel to the first and second guide rods.

* * * * *